(12) United States Patent
Chavez et al.

(10) Patent No.: US 8,204,791 B2
(45) Date of Patent: Jun. 19, 2012

(54) FILE FRAGMENT PRICING IN A SEGMENTED FILE SHARING NETWORK

(75) Inventors: Timothy R. Chavez, Austin, TX (US); Lisa S. DeLuca, San Francisco, CA (US); Christina K. Lauridsen, Austin, TX (US); Sushma B. Patel, Austin, TX (US); Robert R. Peterson, Austin, TX (US); Loulwa F. Salem, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 12/501,846

(22) Filed: Jul. 13, 2009

(65) Prior Publication Data

US 2011/0010258 A1 Jan. 13, 2011

(51) Int. Cl.
*G06Q 30/00* (2006.01)
(52) U.S. Cl. ........ 705/26.1; 705/1.1; 705/27.1; 705/400
(58) Field of Classification Search .................... 705/26, 705/27
See application file for complete search history.

(56) References Cited

U.S. PATENT DOCUMENTS

| | | | |
|---|---|---|---|
| 5,337,044 A | 8/1994 | Folger et al. | |
| 7,203,741 B2 | 4/2007 | Marco et al. | |
| 7,617,178 B2 | 11/2009 | Chavez et al. | |
| 7,761,569 B2 | 7/2010 | Hopkins | |
| 7,788,711 B1 | 8/2010 | Sun et al. | |
| 7,822,711 B1 | 10/2010 | Ranade | |
| 2001/0037311 A1 | 11/2001 | McCoy et al. | |
| 2002/0055906 A1* | 5/2002 | Katz et al. | 705/39 |
| 2002/0152299 A1 | 10/2002 | Traversat et al. | |
| 2002/0178255 A1* | 11/2002 | Hobart | 709/224 |
| 2004/0024766 A1 | 2/2004 | Chung | |
| 2004/0059644 A1* | 3/2004 | Blau | 705/26 |
| 2005/0203851 A1 | 9/2005 | King et al. | |
| 2006/0029093 A1 | 2/2006 | Van Rossum | |
| 2006/0123010 A1 | 6/2006 | Landry et al. | |
| 2006/0167855 A1 | 7/2006 | Ishikawa et al. | |
| 2006/0168318 A1 | 7/2006 | Twiss | |
| 2006/0179143 A1 | 8/2006 | Walker et al. | |

(Continued)

OTHER PUBLICATIONS

Murasame, "A few things to consider while configuring Limewire for optimal performance . . . ", Posted on Gnutella forums by Murasame on Jul. 28, 2004.

(Continued)

*Primary Examiner* — Robert M. Pond
(74) *Attorney, Agent, or Firm* — Stephen B. Tkacs; Stephen J. Walder, Jr.; Steven L. Bennett

(57) ABSTRACT

A mechanism is provided for file fragment pricing in a segmented file sharing system. The mechanism allows peers to set a price for distributing a file through the file sharing system. A peer then becomes a file distributor on behalf of an original file provider. The original file provider may compensate the file distributor based on a compensation agreement. The peer's client may be configured to download file fragments from file distributors, or the original file provider, based on preferences, such as price, peer rating, upload speed, or similarity. As a result, a peer may download a file for a price that is less than the original price from the original file provider. Thus, the mechanism provides an incentive for peers to participate in file sharing, which results in larger swarms.

19 Claims, 8 Drawing Sheets

U.S. PATENT DOCUMENTS

| | | | |
|---|---|---|---|
| 2006/0190715 | A1 | 8/2006 | Miller |
| 2006/0200736 | A1* | 9/2006 | Smit et al. .................... 715/500 |
| 2006/0265436 | A1 | 11/2006 | Edmond et al. |
| 2007/0088622 | A1* | 4/2007 | Floyd ............................. 705/26 |
| 2007/0088703 | A1 | 4/2007 | Kasiolas et al. |
| 2007/0162308 | A1 | 7/2007 | Peters |
| 2007/0180079 | A1 | 8/2007 | Wei et al. |
| 2007/0208748 | A1 | 9/2007 | Li |
| 2008/0016160 | A1 | 1/2008 | Walter et al. |
| 2008/0016194 | A1 | 1/2008 | Chetuparambil et al. |
| 2008/0063003 | A1 | 3/2008 | O'Neal |
| 2008/0133538 | A1 | 6/2008 | Chavez et al. |
| 2008/0133666 | A1 | 6/2008 | Chavez et al. |
| 2008/0133698 | A1 | 6/2008 | Chavez et al. |
| 2008/0133706 | A1 | 6/2008 | Chavez et al. |
| 2009/0106425 | A1 | 4/2009 | Zuckerman et al. |
| 2010/0235432 | A1* | 9/2010 | Trojer ........................... 709/203 |

OTHER PUBLICATIONS

USPTO U.S. Appl. No. 11/566,835.
USPTO U.S. Appl. No. 11/848,668.
USPTO U.S. Appl. No. 11/761,526.
USPTO U.S. Appl. No. 11/761,551.
USPTO U.S. Appl. No. 12/501,704.
Appeal Brief filed Apr. 21, 2010 for U.S. Appl. No. 11/761,526; 26 pages.
Examiner's Answer mailed May 19, 2010 for U.S. Appl. No. 11/761,526; 25 pages.
Notice of Allowance mailed Jun. 8, 2010 for U.S. Appl. No. 11/848,668; 8 pages.
Response to Office Action filed on Mar. 23, 2010 in USPTO U.S. Appl. No. 11/566,835; 20 pages.
Final Office Action mailed Jul. 5, 2011 for U.S. Appl. No. 11/566,835; 11 pages.
Response to Office Action filed Apr. 21, 2011; U.S. Appl. No. 11/566,835, 15 pages.
Clarke, Ian et al., "Protecting Free Expression Online with Freenet", IEEE Internet Computing, 2002, 10 pages.
Cohen, Bram, "Incentives Build Robustness in BitTorrent", http://www.bittorrent.com/bittorentecon.pdf, May 22, 2003, pp. 1-5.
Cohen, Bram, "The BitTorrent Protocol Specification", http://www.bittorrent.org/beps/bep_0003.html, 2008, 6 pages.
Cooper, Mark, "Lamabox—the P2P Video set-top box", PVR Hardware Database, Jan. 19, 2006, http://pvrhw.goldfish.org/tiki-read_article.php?articleId=59, Jan. 19, 2006 , 2 pages.
Ernesto, "Tribler: A social based, BitTorrent powered p2p network", http://torrentfreak.com/tribler-a-socialbased-bittorrent-powered-p2p-network, Feb. 22, 2006, 9 pages.
Golle, Philippe et al., "Incentives for Sharing in Peer-to-Peer Networks", ACM Conference on Electronic Commerce (EC-2001), 2001, pp. 1-18.
Malik, Om, "BitTorrent does legal P2P with NTL", GigaOmniMedia, Inc., http://gigaom.com/2006/02/10/bittorrent-does-legal-p2p-with-ntl/, Feb. 10, 2006, 2 pages.
Pouwelse, J. A. et al., "Tribler: A social-based Peer-to-Peer system", http://iptps06.cs.ucsb.edu/papers/Pouw-Tribler06.pdf, The 5th International Workshop on Peer-to-Peer Systems, Santa Barbara, California, Feb. 27-28, 2006, 6 pages.
"A user-friendly,P2P-social-tagging-capable Wiki as part of Edgy Eft", https://features/launchpad.net/ubuntu/+spec/easy-to-use-wiki, printed Jun. 8, 2009, 2 pages.
"BandwidthSwitcher", halfbakery. http://www.halfbakery.com/idea/BandwidthSwitcher#1002577095, 4 pages.
"BitTorrent", Wikipedia, http://en.wikipedia.org/wiki/Bittorent, 14 pages.
"BitTorrent Wish List", http://wiki.theory.org/BitTorrentWishList, 1 page.
"Distributed Hash Table", Wikipedia, http://en.wikipedia.org/wiki/Distributed_hash_table, 1 page.
"Metainfo File Structure", TheoryOrg, BitTorrentSpecification, Bittorent Protocol Specification v1.0, Section 7, http://wiki.theory.org/BitTorrentSpecification, 19 pages.
"mldonkey, a multi-networks file-sharing client—Tasks: task #4381", Free Software Foundation, Inc., http://savannah.nongnu.org/task/?4381, 6 pages.
"Our goal: to understand protein folding, misfolding, and related diseases", Stanford University, Folding@home distributed computer, http://folding.stanford.edu, 3 pages.
"P2P Internet", halfbakery, http://www.halfbakery.com/idea/P2P_20Internet#10952502800, 3 pages.
"Project RC5", distributed.net, http://www.distributed.net/rc5/, 2 pages.
"SETI@home", University of California, 2006, http://setiathome.ssl.berkeley.edu/, 1 page.
"Swarming Technology", Onion Networks, http://onionnetworks.com/technology/swarming/, 3 pages.
"Tagged with "BitTorrent"", http://odeo.com/tags/bittorrent, printed Jun. 8, 2009, 3 pages.
"Tags / p2p", http://technorati.com/tag/p2p, printed Jun. 8, 2009, 2 pages.
"The Changing Face of BitTorrent", Computer Power User, Caught in the Web, vol. 5, Issue 11, Nov. 2005, http://www.computerpoweruser.com/Editorial/article/asp?guid=&article=articles/archive/c0511/46c11/46c11.asp/, 2 pages.
"Warner Bros. To sell firms via BitTorrent", The Associated Press, MSNBC.com, May 8, 2006, http://www.msnbc.msn.com/id/12694081/print/1/displaymode/1098/, May 8, 2006, 2 pages.
Clarke, Ian, "A Distributed Decentralised Information Storage and Retrieval System", University of Edinburgh, 1999, 45 pages.
Office Action mailed Jun. 23, 2010 for U.S. Appl. No 11/566,835, 44 pages.
Reply Brief filed Jul. 19, 2010 for U.S. Appl. No. 11/761,526, 8 pages.
Legout, Arnaud et al., "Rarest First and Choke Algorithms are Enough", ACM, Oct. 2006, 14 pages.
Appeal Brief filed with the USPTO on Oct. 26, 2010 for U.S. Appl. No. 11/566,835, 32 pages.
Office Action mailed Jan. 21, 2011 for U.S. Appl. No. 11/566,835; 12 pages.
Interview Summary dated Sep. 23, 2011 for U.S. Appl. No. 11/566,835; 3 pages.
Notice of Allowance mailed Oct. 26, 2011 for U.S. Appl. No. 11/566,835; 23 pages.
Office Action mailed Oct. 20, 2011 for U.S. Appl. No. 12/501,704; 19 pages.
Response to Final Office Action filed Sep. 22, 2011, U.S. Appl. No. 11/566,835, 10 pages.
Final Office Action mailed Mar. 20, 2012 for U.S. Appl. No. 12/501,704; 13 pages.
Response to Office Action filed with the USPTO on Jan. 20, 2012 for U.S. Appl. No. 12/501,704, 12 pages.
USPTO U.S. Appl. No. 13/368,410, Apr. 20, 2012, 2 pages.

* cited by examiner

FIG. 7

- PREFERENCES — 700
- PARTICIPATE IN BACKGROUND SHARING? — 710
  - ● YES
  - ○ NO
- BANDWIDTH FOR BACKGROUND SHARING: — 720
- HARD DISK SPACE FOR BACKGROUND SHARING: — 730
- NUMBER OF BACKGROUND SWARMS: 2 — 740
- BACKGROUND FILE FRAGMENTS EXPIRE AFTER: — 750
  - [ ] TIME    [ ] % CONTRIBUTION

- SUBSCRIBED COMMUNITIES: — 760
- TRUSTED PEERS: — 770
- BLOCKED PEERS: — 780

FILE FRAGMENT PRICING IN A SEGMENTED FILE SHARING NETWORK

BACKGROUND

The present application relates generally to an improved data processing system and method. More specifically, the present application is directed to background file sharing in a segmented peer-to-peer file sharing network.

Peer-to-peer file sharing programs are designed to widely distribute large amounts of data, while minimizing costly server and bandwidth resources. Peer-to-peer (P2P) systems, such as the BITTORRENT P2P file sharing system, have gained a wide following. P2P systems have recently been put to commercial use through partnerships with content providers, such as media and cable companies. P2P networks are gaining credibility as a means for legal revenue generating activity—creating a need for methods to rapidly optimize content delivery.

In one implementation, a file is made available for P2P download by providing a link to file information, often stored on a hypertext transport protocol (HTTP), or Web, server. In the BITTORRENT file sharing system, this file information is referred to as a "torrent." The file information may include, for example, file name, file length, and hashing information.

The file information may also include the address of a tracker, which is a device in the P2P network that helps downloaders (peers) to find each other. Peers communicate with the host of the file information and the tracker using a simple protocol layered on top of HTTP. Each peer sends information about what file it is downloading, on what port it is listening, and other information. The tracker responds with a list of contact information for peers that are downloading the same file. However, the communication between a peer and a tracker requires much less bandwidth than a direct server-to-client file download.

In a typical P2P implementation, a file is divided into pieces of fixed size, e.g., 256 KB. Each downloader reports to its peers what pieces it has. Also, each downloader, at some point, uploads file pieces, also referred to as segments or fragments, to its peers. Whenever, a downloader finishes downloading a file fragment, the P2P client software performs a hash of the file fragment and compares the hash to an expected hash value, received in the file information, to determine if the file fragment downloaded correctly and has not been corrupted. If the file fragment downloads correctly, then the client reports to its peers that it has the file fragment available for upload.

At least one peer must start with the whole file. This peer is referred to as a "seed." Eventually other peers will possess the whole file, or at least every file fragment will be found on at least one client. Some peers may leave the network before possessing the whole file, while others may remain in the network well after completing retrieval of the file. The goal is to balance downloading clients with uploading clients.

Several techniques or policies may be used to ensure that it is possible to download the entire file. For example, the tracker may return a random list of peers to each new participant in the download. As another example, P2P clients may attempt to request the rarest file fragment first. As more peers request the rarest file fragment, another file fragment becomes the rarest, and so forth. This technique helps to equally distribute the demand for particular file fragments. Other techniques, such as "random first" and "endgame mode" may be used; however, they are not a focus of this disclosure and will not be discussed in detail.

Content distribution among peers increases in efficiency with the number of peers who are sharing that content on a network. A network of peers participating in distributing a particular file is referred to as a "swarm." Swarms are formed around the retrieval of a particular file and are comprised of peers retrieving (downloading) and sharing (uploading) file fragments simultaneously. The larger a swarm, the more likely a downloading peer is to have donating peers that are close by (i.e. with less network hops) facilitating a faster file download, and the more distributed the bandwidth cost becomes for each participant client device.

SUMMARY

In one illustrative embodiment, a method is provided in a peer-to-peer file sharing client for file sharing in a peer-to-peer file sharing network. The method comprises setting price information for a file to be shared in the peer-to-peer file sharing network, determining file fragment price information for a plurality of file fragments that make up the file based on the price information, and responsive to receiving a request for a given file fragment within the plurality of file fragments from a requesting peer, uploading the given file fragment to the requesting peer. The method further comprises receiving compensation for uploading the given file fragment to the requesting peer.

In another illustrative embodiment, a method is provided in an account management server for pricing in a peer-to-peer file sharing network. The method comprises establishing a compensation agreement with a distributor peer. The distributor peer stores at least one file fragment for a file to be distributed. The method further comprises, responsive to the distributor peer uploading a given file fragment within the at least one file fragment for the file to be distributed to a participant peer in the peer-to-peer file sharing network, receiving price information for the given file fragment. The method further comprises determining a compensation amount for the distributor peer based on the price information and the compensation agreement and assigning the compensation amount to the distributor peer.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 depicts an example screen of display for a preferences user interface in accordance with an illustrative embodiment;

DETAILED DESCRIPTION

The illustrative embodiments provide a mechanism for file fragment pricing in a segmented file sharing system. The mechanism allows peers to set a price for distributing a file through the file sharing system. A peer then becomes a file distributor on behalf of an original file provider. The original file provider may compensate the file distributor based on a compensation agreement. In one example embodiment, the original file provider may give the file distributor a percentage of the price set by the distributor. In another example embodiment, the original file provider may assign reward points to file distributors for each file or file fragment shared in the file sharing system. The peer's client may be configured to download file fragments from file distributors, or the original file provider, based on preferences, such as price, peer rating, upload speed, or similarity. As a result, a peer may download a file for a price that is less than the original price from the original file provider. Thus, the mechanism provides an incentive for peers to participate in file sharing, which results in larger swarms.

Figure 1:
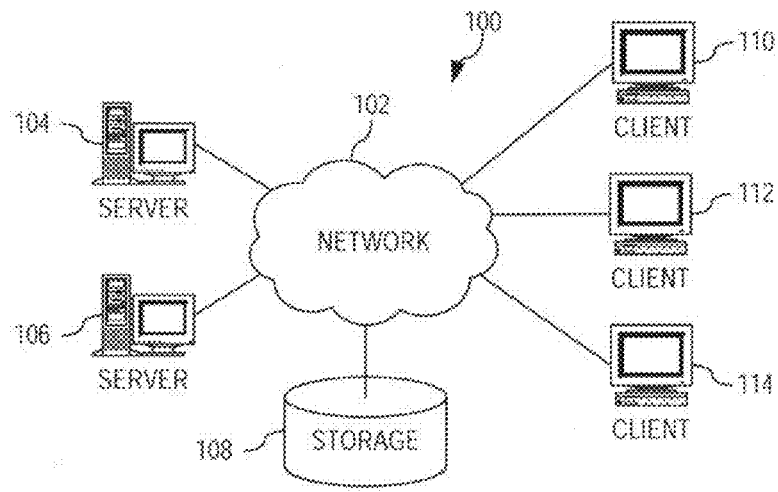
FIG. 1 depicts a pictorial representation of an example distributed data processing system in which aspects of the illustrative embodiments may be implemented.
Figure 2:
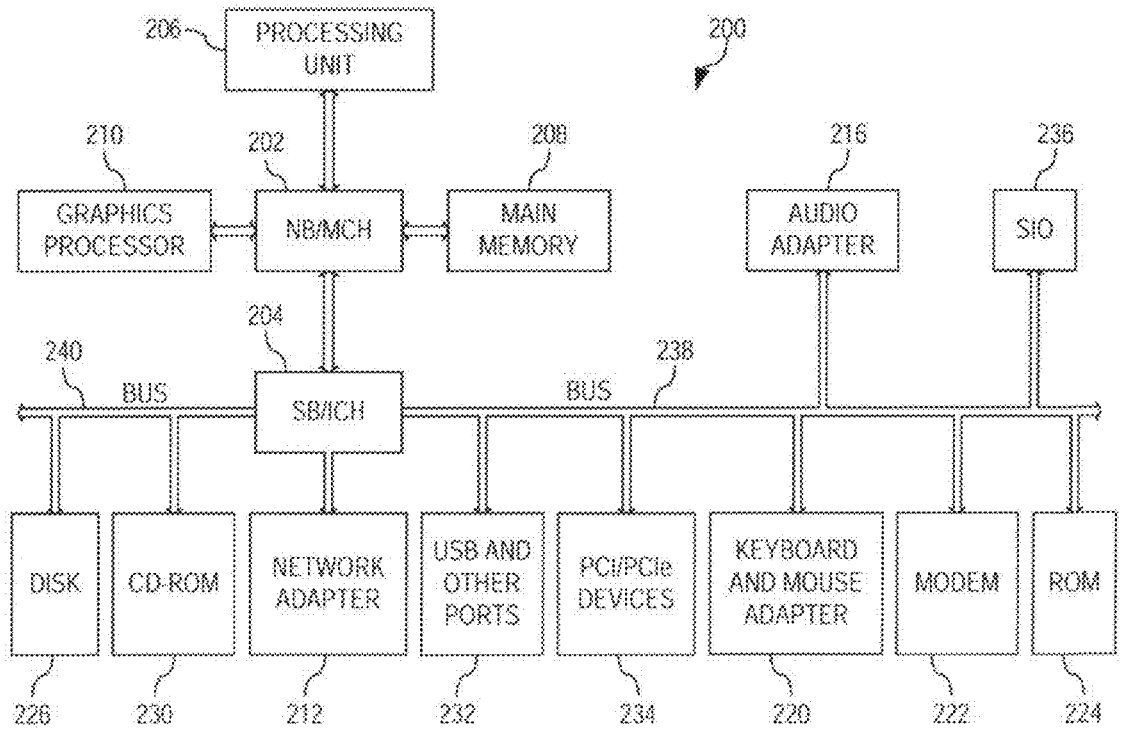
FIG. 2 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which example aspects of the illustrative embodiments may be implemented. While the description following FIGS. 1 and 2 will focus primarily on a single data processing device implementation, this is only example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In one illustrative embodiment, server 104 may provide access to a Web page or other content that contains a link to file information for a given file. Server 106 may be a tracker for the file. Clients 110-114 may have peer-to-peer (P2P) file sharing clients that participate in downloading the given file.

More particularly, clients 110 and 112 may already be members of a swarm, each downloading file fragments from and uploading file fragments to peers in the swarm. A user at client 114 may click on the link, which results in the P2P client software downloading file information including, for example, file name, file length, hashing information, and an address of the tracker at server 106. The address of the tracker may be a uniform resource locator (URL), for instance.

The P2P client software at client 114 may then contact the tracker at server 106, which, in turn, responds with addresses of clients 110, 112. Client 114 then establishes communication with clients 110, 112, and begins downloading file fragments. As client 114 downloads file fragments, it reports the file fragments it has available for upload to the other peers in the swarm.

In the depicted example, distributed data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

The efficiency of content distribution increases relative to the number of peers who are sharing that content. The peers are segmented in the file sharing network. Swarms are formed around the retrieval of a particular file. If the number of peers sharing a file is too low, then the number of peers having a given file fragment may be low as well. As a result, a P2P client that has a rare file fragment available for upload may receive a high number of requests for that file fragment, and the bandwidth is not ideally distributed among the peers. Increasing the number of peers in a swarm helps to more evenly distribute the bandwidth costs.

In accordance with the illustrative embodiments, a peer-to-peer file sharing system is provided in which participant clients make an amount of storage space and bandwidth available for background file sharing. That is, a P2P client may participate in a swarm even if the user of that client did not explicitly request that file. In this manner, swarms are grown without the need to advertise a file, through a Web site, for example. Peers may participate in a swarm by sharing file fragments in the background without attempting to possess the entire file.

Normally, in the prior art, a swarm is formed around a particular file out of want, or "pull," so the swarm is defined by all users wanting that file. However, in accordance with the illustrative embodiments, a swarm may also be formed based on storage space and bandwidth available for sharing information, either file fragments or some other information about the file. The net effect is a larger swarm, a higher density of participation, and more evenly distributed bandwidth costs.

With reference now to FIG. 2, a block diagram of an example data processing system is shown in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
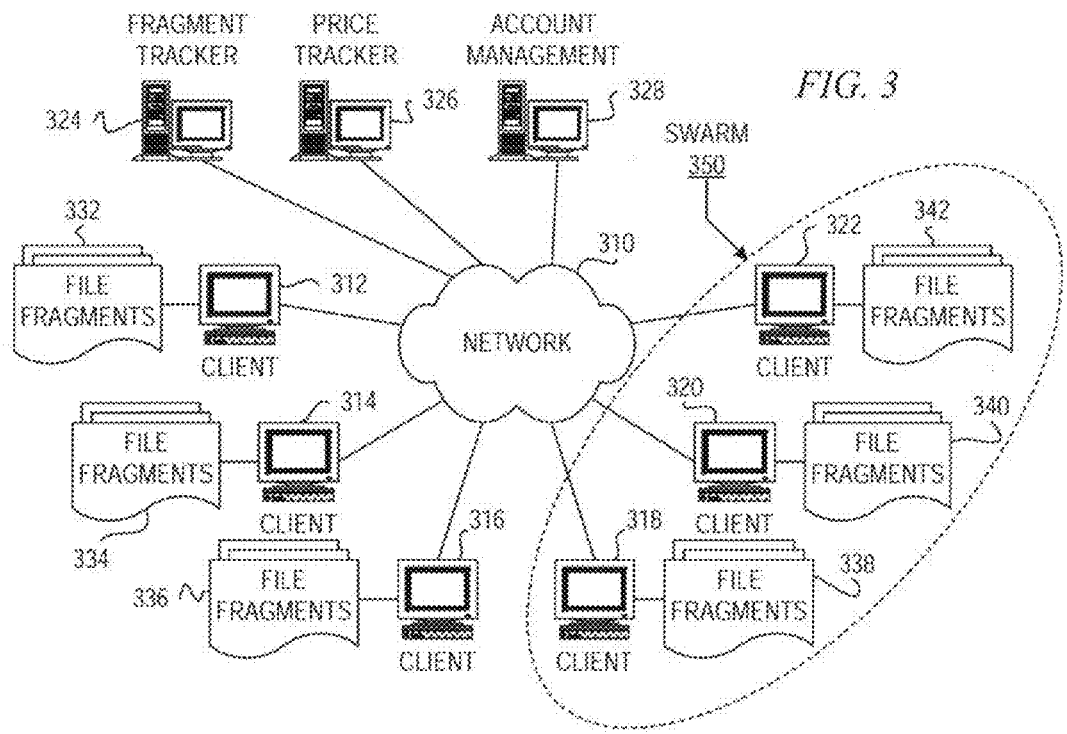
FIG. 3 depicts a pictorial representation of a segmented file sharing network in accordance with an illustrative embodiment.

FIG. 3 depicts a pictorial representation of a segmented file sharing network in accordance with an illustrative embodiment. Clients 312-322 are connected to network 310. Tracker 324 is responsible for helping clients 312-322 find each other to form segmented networks, or "swarms," of peers for downloading/uploading particular files. Clients 312-322 possess file fragments 332-342, respectively.

In the depicted example, clients 318, 320, 322 are part of swarm 350. Clients 312, 314, 316 may be participants of other swarms. In accordance with an illustrative embodiment, clients 312, 314, 316 may provide bandwidth and storage space for background file sharing. That is, client 316, for instance, may take part in swarm 350 without a user at client 316 expressly requesting the file being distributed in swarm 350.

Background file sharing represents one solution for growing swarms, allowing active participants to allocate storage and bandwidth to swarms in which they would not otherwise participate. In accordance with an illustrative embodiment, a mechanism is provided for file fragment pricing in a segmented file sharing system. The mechanism allows peers to set a price for distributing a file through the file sharing system. A peer then becomes a file distributor on behalf of an original file provider. The original file provider may compensate the file distributor based on a compensation agreement. In one example embodiment, the original file provider may give the file distributor a percentage of the price set by the distributor. In another example embodiment, the original file provider may assign reward points to file distributors for each file or file fragment shared in the file sharing system. The peer's client may be configured to download file fragments from file distributors, or the original file provider, based on preferences, such as price, peer rating, upload speed, or similarity. As a result, a peer may download a file for a price that is less than the original price from the original file provider. Thus, the mechanism provides an incentive for peers to participate in file sharing, which results in larger swarms.

A content provider may provide a file, such as a song or movie, for example, for legal download for a price. Typically, a content provider would host the file and have all customers download the file. However, under that model, the content provider would be responsible for all download bandwidth for all customers. Furthermore, content providers attempting to distribute content through digital distribution channels face the challenge of competing with illegal digital downloads via peer-to-peer networks. The mechanism of the illustrative embodiment allows the content provider to compensate peers for distributing the file on behalf of the content provider. Thus, the mechanism of the illustrative embodiment provides a legal file distribution method that encourages customers to participate in legal redistribution rather than illegal distribution.

For example, in one embodiment, the content provider may set an original price for the file and offer a 10% discount to peers for distributing the file. Then, for each file fragment the distributor peer uploads to another peer, the content provider may assign compensation to the distributor peer. For instance, the distributor peer may give 10% of each file fragment price back to the distributor peer, keeping 90%, and accumulate this value until the discount amount is reached. The content provider may then keep 90% of each subsequent download, while saving the cost of hosting the file centrally.

In another example embodiment, the content provider may assign reward points to a distributor peer for each file fragment, each predetermined number of file fragments, or each predetermined dollar value earned through file fragment upload by the distributor peer. The user of the distributor peer may then redeem the reward points for free downloads, larger discounts, merchandise, theme park admission, concert or movie tickets, or quality upgrades, for example.

With reference to FIG. 3, a content provider may initially distribute the content file by providing the file using a seed, such as client 322, for example. File fragments 342 may include the originally provided content file. The content provider may then provide a torrent file at fragment tracker 324, which informs peers that file fragments 342 are available through client 322, which is the seed peer.

Price tracker 326 monitors and reports pricing information for files and file fragments. Therefore, the original content provider may report the original price of the file to price tracker 326. In one example embodiment, the price for a file fragment may simply be the price of the file divided by the number of file fragments. A large file may have thousands, even tens of thousands, or more, file fragments. For example, a high definition movie may be 4 GB in size. A typical file fragment size may be 256 KB. Therefore, a 4 GB movie file may have more than 15,625 file fragments, for example. If the original price of the movie is $20.00, then the price of a file fragment, with flat fragment pricing, would be $0.00128. In this example, the first participant peer to download the movie file would only find the file fragments at the seed peer at client 322. This first participant peer, at client 320, for example, may then pay $0.00128 per file fragment and $20.00 for the whole file.

Each time client 320 downloads a file fragment, it reports to fragment tracker 324 that it has the file fragment for other peers to download and reports to price tracker 326 the price of the file fragment. Account management server 328 may then receive price information for downloaded and uploaded file fragments from price tracker 326 and debit and credit peer accounts accordingly. Account management server 328 may periodically query price tracker 326 for new download and upload file fragment pricing, remove duplicate information, correlate the information by peer and file identification, determine download charges and compensation amounts, and so forth.

Various combinations of seed peer client 322, fragment tracker 324, price tracker 326, and account management server 328 may be embodied within a single computer. For example, seed peer client 322 and fragment tracker 324 may be embodied within one server computer, while price tracker 326 and account management server 328 may be embodied within another server computer. In another example, fragment tracker 324 and price tracker 326 may be combined into a single entity. As yet another example, all of seed peer client 322, fragment tracker, price tracker, and account management server 328 may be within a single server computer or server cluster under the control of the content provider.

Once a peer, such as at client 320, begins to receive file fragments 340, the peer may enter into a compensation agreement with the original content provider to encourage the peer to participate in peer-to-peer file distribution. For example, the original content provider may list the original content, such as a movie, at $20 and offer a 10% discount to customers for participating in distribution. Client 320 then becomes a distributor peer and subsequent peers, such as peer 318 may find file fragments at the seed peer 322 and the distributor peer 320.

Each time client 318 downloads file fragment from client 320, it reports that it has file fragments 338 to fragment tracker 324 and reports the price of each file fragment and an identification of the distributor peer to price tracker 326. For example, client 318 may download a file fragment from client 320 for $0.00128 and report this information to price tracker 326. Account management server 328 may then receive this information from price tracker 326 and charge the account of the peer at client 318 $0.00128 for the file fragment. Account management server 328 may then credit the account of the distributor peer at client 320 $0.000128 (10% of $0.00128) and keep the rest. Alternatively, account management server 328 may accumulate the compensation amount and apply the credit for each $0.01 or $1.00, for example.

While the content provider receives less money for each file fragment distributed by a distributor peer, the content provider actually bears less cost in distributing the file. The more file fragments that subsequent peers download from distributor peers, the fewer the number of file fragments being downloaded from the seed peer, and the less bandwidth the content provider is required to support for file distribution. After all, the more file fragments that subsequent peers download from distributor peers, the more customers are actually purchasing the file, and the content distributor still receives a majority of the money being collected. Customers are encouraged to keep files in storage for sharing, which grows the swarm increases file fragment availability. This results in lower distribution costs for the content provider and a more pleasurable download experience for subsequent peer-to-peer file sharing participants.

While account management server 328 may continue to compensate distributor peer 320 for every file fragment that it distributes to other peers, the account management server 328 may limit the amount of compensation a distributor peer may receive for each file. For example, as described above, the content provider and the distributor peer may enter into a compensation agreement defining a compensation level at 10% for each file. Therefore, when the distributor peer reaches this compensation level, account management server 328 may stop crediting the account of the distributor peer.

In another example embodiment, account management server 328 may compensate distributor peers in other forms. For example, account management server 328 may assign a reward point to distributor peers for every file fragment distributed, every thousand file fragments distributed, every $1.00 worth of file fragments distributed, or the like. The distributor peer may then redeem accumulated reward points for rewards, such as free downloads, discounts, merchandise, airline miles, quality upgrades, etc. In one embodiment, account management server 328 may provide a discount on the file up to an agreed upon compensation amount, as described above, and then once the distributor peer reaches the compensation amount, account management server 328 may begin to assign reward points. In another embodiment, account management server 328 may cap the number of reward points a distributor peer may accumulate for a given file or for a given month or year, for instance. More particularly, account management server 328 may assign reward points for file distribution via background file sharing.

In one example embodiment, each distributor peer may have a compensation level. For example, a "steel" distributor may receive a 5% discount, a "bronze" distributor may receive a 10% discount, a "silver" distributor may receive a 15% discount, a "gold" distributor may receive a 20% discount, and a "platinum" distributor may receive a 25% discount. The distributor peer may advance levels based on time, money spent, number of file fragments distributed, participant feedback, amount of background file sharing resources, or the like. Alternatively, a distributor peer may redeem a number of reward points to advance to a next compensation level. The number of reward points required for each level may become greater for each higher level.

In one illustrative embodiment, a distributor peer may set its own price for distributing the file via the peer-to-peer file sharing network. For example, a distributor peer at client 320 may receive the original file from the seed peer at client 322 for the original price of $20.00. The distributor peer may then decide to provide the file for $18.00. In this case, considering a 4 GB file with 15,625 file fragments, each file fragment may then cost a subsequent participant peer $0.001152 if that participant peer downloads the file fragment from the distributor peer. That is, the distributor peer may receive as compensation a predetermined percentage of the price for each file fragment not to exceed a predetermined percentage of the original price of the file fragment. These lower prices help to offload demand from the seed peer.

A distributor peer may query price tracker 326 to determine existing prices before setting a price for distribution. Price tracker 326 may return results including the original price, average price, low price, and so forth. Given this price information, a participant at client 320, for example, may set a distribution price, which may then be reported to price tracker 326.

While a lower price may increase the number of file fragments being downloaded from a distributor peer, the compensation amount will decrease, because the compensation amount may be a predetermined percentage of the price. Thus, if the distributor peer sets the price of a file at $18.00 for a 4 GB file with 15,625 file fragments, then the distributor peer will receive $0.0001152 as compared to $0.000128 for the original price. More to the point, the distributor would not be as motivated to set the price to $1.00 and receive only $0.000006526 for each file fragment.

In one example embodiment, the peer-to-peer file sharing client software may limit the number of file fragments being distributed. Even without such a limit, the network bandwidth of the client computer would inherently limit the number of file fragments being shared. Therefore, while most peers may attempt to download every file fragment from a distributor peer that is undercutting the other peers and the original content provider, the inherent limitations of the client computer would limit the number of file fragments being shared at a low price. In fact, given the manner in which peer-to-peer file sharing client software typically pushes file fragments, a distributor peer that is undercutting other peers may unwittingly help to distribute the rarest files at the lowest prices. Regardless, the content provider and/or the peer-to-peer client software may impose price minimums to help control pricing.

The content provider may control the maximum price by providing the seed peer. If a distributor peer sets a price that is higher than the original price, then subsequent participant peers can simply get each file fragment from other distributor peers or, at the very least, the seed peer. Furthermore, the amount of compensation for a given file fragment may be limited to a predetermined percentage of the original price of the segment. Therefore, a distributor peer with prices that are higher than the original prices will be unlikely to distribute many file fragments and, thus, will be unlikely to receive compensation.

Because each distributor peer may offer a file for a different price, a new peer joining a swarm must have a way to request a file for download. In accordance with one embodiment, a peer, such as client 318, may request a file and define a maximum file price and/or a maximum file fragment price. Client 318 may query price tracker 326 for prices for a given file. Price tracker 326 may return results that include the original price, an average price, a low price, and so forth. A participant at client 318 may then set a maximum price based on the results from price tracker 326.

In one example embodiment, a participant at client 318, for example, may rank parameters according to which the peer-to-peer file sharing client software selects peers for downloading file fragments. The peer-to-peer file sharing client software may select a peer from which to select a given file fragment according to price, peer rating, upload speed, or similarity. For example, client 318 may simply select whatever peer has the lowest price for the given fragment. Alternatively, client 318 may select a distributor peer that has a highest rating, which may indicate that the peer received positive feedback from participant peers, has distributed a high number of files or file fragments, has been highly rated by the content provider, or the like. Client 318 may also select a peer that has a highest upload speed. As another example, client 318 may select a peer that has a high similarity, which may mean that the peer has a large number of common files, belongs to the same communities, or the like. Client 318 may take all of these parameters into account in a ranked or weighted fashion when selecting a peer for downloading a given file fragment.

In an illustrative embodiment, the peer-to-peer file sharing client software may set file fragment pricing according to rarity. In other words, the rarest file fragment may have a highest price and a least rare file fragment may have a lowest price such that the total of all the file fragment prices is equal to the file price set by the distributor peer. The peer-to-peer file sharing client software may periodically query fragment tracker 324 to determine the rarity of each file fragment and adjust the file fragment prices accordingly.

Figure 4:
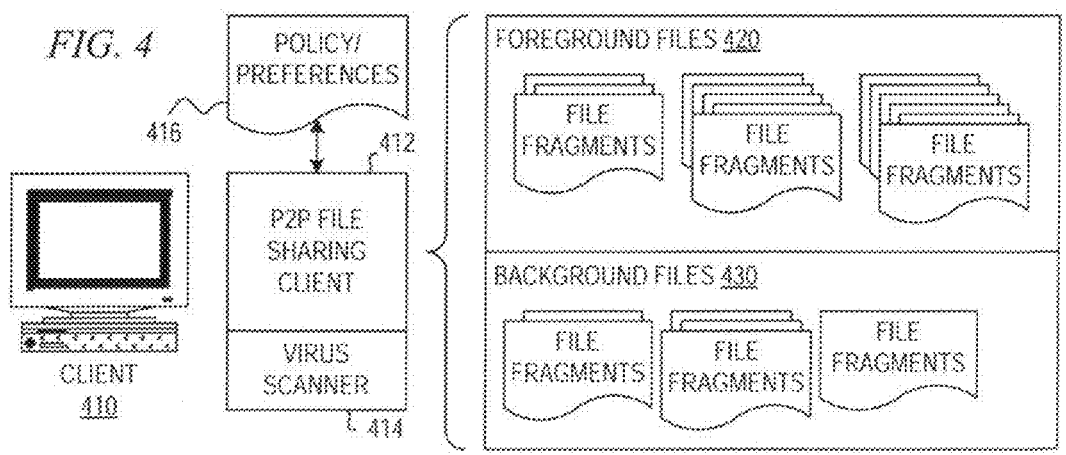
FIG. 4 is a block diagram illustrating a configuration of a peer-to-peer client with background file sharing in accordance with an illustrative embodiment.

FIG. 4 is a block diagram illustrating a configuration of a peer-to-peer client with background file sharing in accordance with an illustrative embodiment. Client 410 includes peer-to-peer (P2P) file sharing client 412 and virus scanner 414. When a user of client 410 selects a file for download, P2P client 412 contacts the tracker, receives a list of peers, and requests file fragments.

Files that are expressly requested by a user, or otherwise being of express interest to the user, are downloaded in the foreground. For example, a user may subscribe to a particular group, and, thus, may automatically retrieve files being shared by that group. As another example, the client may be programmed to retrieve any new episode of a particular video broadcast or any new music from a particular artist. File fragments for these files are stored in foreground files 420.

Note that content being distributed in the peer-to-peer network, as described herein, is managed content. P2P client 412 may include functionality for preventing illegal distribution or receipt of copyrighted content. For example, P2P client 412 may validate a digital signature of a file with a trusted third party. However, preventing illegal distribution is not a focus of this disclosure, and such functionality will not be discussed in detail.

In accordance with the illustrative embodiment, P2P client 412 also receives and shares file fragments in the background to grow swarms in which the user of client 410 is not expressly interested. In other words, P2P file sharing client 412 may automatically share file fragments without the user manually requesting the download. The user may not intend to view the content and does not need to monitor the background file sharing. P2P client 412 stores file fragments that are downloaded in the background in background files 430.

The file fragments in foreground files 420 are downloaded with the express purpose of possessing the entire file, although a user may cancel a download without ultimately possessing the entire file. On the other hand, the file fragments in background files 430 will likely never result in the entire file being downloaded. Rather, file fragments in background files 430 may be only the most rare file fragments, may expire after a specified period of time, or may remain small in number due to storage or bandwidth limits specified by the user.

For security, background files 430 may be a portion of storage that is partitioned to a defined space on a storage device within client 410, where it cannot be executed. Virus scanner 414 may be applied to background files 430, or perhaps all content within foreground files 420 and background files 430.

In one example embodiment, P2P file sharing client 412 may select peers based on protocol/client. When a downloader participates in a swarm, it receives information in the background, such that it can participate as a peer in other swarms. This may include all users of a particular P2P protocol or client. For example, if P2P file sharing client 412 is a BITTORRENT client, then P2P client 412 may participate with any other swarms it discovers, in the background, as long as the peers in the other swarms are BITTORRENT clients communicating using the BITTORRENT protocol.

In another embodiment, P2P file sharing client 412 may also select peers for background file sharing based on user-selected communities. Users may opt-in to support particular communities, rather than sharing files at random. For example, if the file sharing system encompasses a community of artists, the members of that community may use P2P file sharing to share high-resolution images and media of art with each other. A particular peer subscribed to the community may have pieces of all different media on the client device that are of no particular interest to the user, but the P2P client hosts those file fragments to help provide a high-quality distribution channel to everyone in the community.

P2P client 412 may have user-defined limits on the amount of storage and/or bandwidth available for background file sharing. Oldest file fragments, least recently requested file fragments, or least frequently requested file fragments may be overwritten such that the most relevant content is always available within a limited storage space.

P2P client 412 may also allow the user to select trusted peers. The P2P file sharing system may then build trust among peers, for example, by sharing a list of trusted peers that can be modified by each client according to their relationships. Users may also build lists of peers that are known to be malicious (blacklist).

Information about the policy and preferences under which P2P file sharing client 412 operates may be stored in policy/preferences data structure 416. Thus, policy/preferences data structure 416 may store security policies or preferences, peer selection policies or preferences, storage/bandwidth limits, a list of trusted peers, or a list of blacklisted peers, as described above.

In one illustrative embodiment, P2P file sharing client 412 allows a user to select a price for purchasing a file through the P2P file sharing network. P2P file sharing client 412 may query a price tracker to receive current price information for the file. This price information may include the original price set by the content provider, an average price being offered by peers in the swarm, and a lowest price. P2P file sharing client 412 may present a graphical user interface (GUI) (not shown) to the user to present the price information and to allow the user to select a price. The GUI may allow the user to set a maximum file price and/or a maximum file fragment price. In one example embodiment, the GUI may allow the user to rank parameters according to which P2P file sharing client 412 selects peers for file fragment download. P2P file sharing client 412 may store the maximum file price, maximum file fragment price, and/or parameter ranking in policy/preferences 416.

As P2P file sharing client 412 downloads file fragments into foreground files 420 or background files 430, P2P file sharing client 412 reports to the fragment tracker and the price tracker. An account management server may then charge the user for each file fragment or may charge the user when the entire file download is completed.

Also, when P2P file sharing client 412 uploads file fragments from foreground files 420 or background files 430, either P2P file sharing client 412 or the recipient peer reports the price information to the price tracker. The account management server may credit the user for each file fragment uploaded (distributed) to another peer. For example, the account management server may credit a portion of a discount on a file in foreground files 420 for each file fragment from that file uploaded to another participant peer. As another example, the account management server may assign reward points for file fragments uploaded from foreground files 420 or background files 430.

Figure 5:
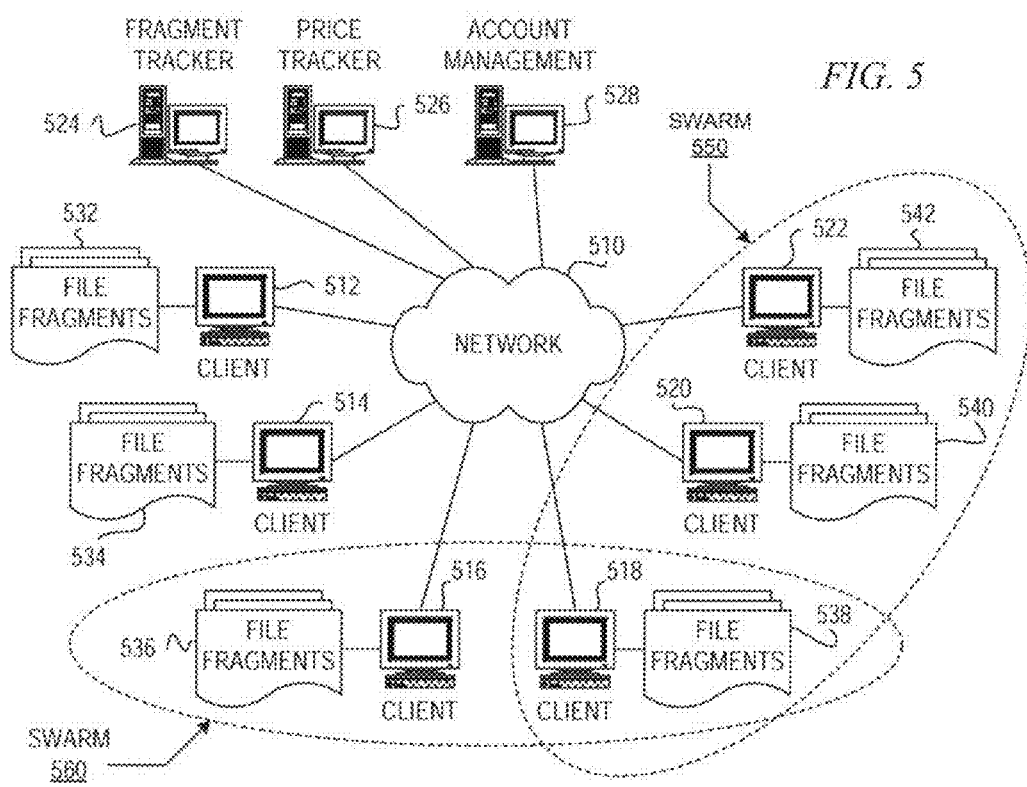
FIG. 5 depicts a pictorial representation of a segmented file sharing network with background file sharing in accordance with an illustrative embodiment.

FIG. 5 depicts a pictorial representation of a segmented file sharing network with background file sharing in accordance with an illustrative embodiment. Clients 512-522 are connected to network 510. Fragment tracker 524 is responsible for helping clients 512-522 find each other to form segmented networks, or "swarms," of peers for downloading/uploading particular files. Clients 512-522 possess file fragments 532-542, respectively. Price tracker 526 tracks the prices of files and file fragments being distributed in a swarm. Account management server 528 receives price information from price tracker 526 and credits or debits the accounts of file sharing participants. As discussed above, account management server 528 may assign compensation to distributor peers in the file sharing network. This compensation may take the form of monetary compensation, discounts on file downloads, reward points, or the like.

In the depicted example, clients 518, 520, 522 are part of swarm 550. In addition, clients 516, 518 are part of swarm 560. Clients 512-522 maybe participants of other swarms. In accordance with an illustrative embodiment, client 516 may provide bandwidth and storage space for background file sharing. That is, client 516, for instance, may take part in swarm 550 without a user at client 516 expressly requesting the file being distributed in swarm 550.

What files, or file fragments, are shared in the background can vary based on the community model utilizing the background file sharing technique of the illustrative embodiments. In one example embodiment, a central server and/or provider (not shown) may record and control where files and file fragments exist on the network. This central provider may send commands to peers 512-522 indicating which files to request from other peers in the network in order to increase swarm size, especially for more popular files.

In another example embodiment, the distribution method allows peers 512-522 to trade file segments based on the rarity of the segments in each swarm. In this case, the actual information being distributed among peers is the file itself. When a peer joins a swarm, it begins retrieving the file and sharing it with other peers at the same time. When a peer receives a piece of the file, it exchanges a piece of another file in the background based on the rarity of the piece it received. For example, in exchange for receiving a file fragment that is N rare from client 520, client 516 may trade 5 file fragments that are each N/5 rare. In an alternative embodiment, P2P clients may share file fragments without considering the rarity of the file fragments. For example, P2P clients may share file fragments at random or based on relative/comparable size.

In a community where the swarms (and files) are contained and controlled, file fragments given to a peer in the background are likely to be relevant and useful to another peer. For example, in P2P file sharing system within a work environment, there is a high probability that files or file fragments shared in one swarm will be relevant to another swarm. In any event, how often a trade for file fragments is performed between two peers is trivial as long as another swarm is able to gain a peer with which the swarm may share at least one piece.

Once a background peer receives a small number of file fragments, that peer will likely only be uploading in the background; it will not be receiving in that swarm until it can assist the swarm with other rare file fragments. For example, client 516 may receive and host a small number of rare file fragments for swarm 550. Client 516 will not receive any more file fragments for swarm 550 until those file fragments expire, are no longer rare, or peers in swarm 550 drop out of the swarm leaving even rarer file fragments. Alternatively, client 516 may receive and host a small number of file fragments until they expire, and then cease background file sharing in swarm 550 altogether, for example.

In fact, a peer sharing in the background may also share parts of the swarm in which it is participating in the foreground, automatically increasing the size of its own swarm. For instance, client 516 may host file fragments for background file sharing in swarm 550; however, clients 518-522 may also host file fragments for swarm 560 to grow the size of that swarm. If both swarms are the same size, background file sharing may nearly double the size of both swarms.

Background file fragments may expire after a given amount of time or contribution percentage. The background may be fully configurable by the peer to control how much space can be used for background sharing, how much bandwidth can be used for background sharing, how much of a file can be shared in the background, a minimum rarity for file fragments to be hosted in the background, number of background swarms in which to participate, etc.

Presumably, the P2P file sharing protocol or client algorithm may dictate that the rarest pieces of a swarm are to be sent to the background peers to make them less rare. The first link between two swarms may be made by at least one peer that is "intentionally" interested in both swarms. That peer, the user of which requests both files, may then propagate background sharing information (file information) to the other peers in both swarms.

Rather than trading actual content, peers may trade file names or file fragment identifiers. Upon receiving a new file name or identifier, a peer may request that file from the network, either in the background or the foreground. For example, once client 516 begins background file sharing in swarm 550, client 516 may propagate file information for files it possesses to all or a portion of the peers in swarm 550. Those clients now have the file information for a file without the user having to find that file advertised on a Web site, for example.

Each peer must know which files, or file fragments, to download in the background. One way to distribute this information is to pass a list between peers in the network that is populated with the names of the files that currently reside on each user's local system. Once a peer receives the list from another peer, it may select files or fragments from the list to request from the list sender or from all connected peers in that swarm. The file list could piggyback onto a file fragment that is transferred as a result of a manual client request.

Alternatively, a P2P client may pass a list of files to download based on known rare segments or popular files within the network. Rather than passing a list of files on the peer systems, the list may contain file fragments that were rarest at the time of a previous download. Alternatively, the list may contain identifiers of files recently requested by peers with counters that increase when more than one peer who has held the list has recently requested the same content. These lists may be based on manual user requests or on background requests. Each client may manipulate the list and pass it on. In an alternative embodiment, the list may be sent by a tracker to a peer.

In another example embodiment, the P2P client may share files based on similar files shared within the swarm. Similar to Web sites that provide "users who purchased X also purchased Y" information, the P2P client may share files in the background according to correlated features, such as "artist" for music or a download timestamp within a certain range. When a user manually requests a file, background sharing may be initiated for files that are in some way correlated to that file. Those file fragments are likely to also be requested within that given swarm.

In yet another example embodiment, a P2P client may share files using file lists obtained from a peer file-list-swap or a central provider (not shown). Peers may determine which files to request for background download based on pattern matching between a user attribute or timestamp and a particular data sequence in the file name. Matching strings could include particular bit sequences contained in either the original strings or hashes/checksums of the original strings.

Figure 6:
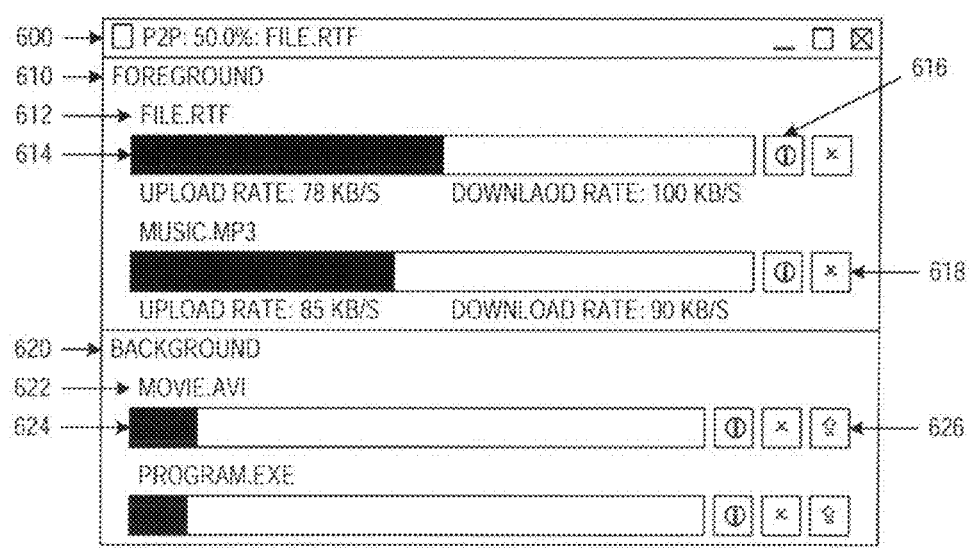
FIG. 6 depicts an example screen of display for a peer-to-peer client with background file sharing in accordance with an illustrative embodiment.

FIG. 6 depicts an example screen of display for a peer-to-peer client with background file sharing in accordance with an illustrative embodiment. Peer-to-peer (P2P) client window 600 includes a foreground download portion 610 and a background portion 620.

Foreground portion 610 presents files that are being downloaded in the foreground, e.g. files that were expressly requested by a user of the P2P client. For each file, foreground download portion 610 presents file name 612 and progress bar 614. Also for each file being downloaded in the foreground, portion 610 presents an information control 616 and a cancel control 618. Responsive to the user selecting information control 616, the P2P file sharing client may present information about the file, such as the file name, file size, and so forth. Responsive to the user selecting cancel control 618, the P2P file sharing client may cease downloading of the file; however, the client may continue to upload file fragments it possesses to the peers in the swarm.

Background portion 620 presents files that are being downloaded in the background. For each file, background portion 620 presents a file name 622 and a progress bar 624. In one embodiment, progress bar 624 may present the progress with respect to the file size; however, background downloads are very unlikely to result in the entire file being downloaded. In fact, the purpose of background file sharing is to host a small number of rare file fragments for upload without a significant amount of download from the swarm. Therefore, progress bar 624 may represent other information, such as the percentage of background storage space used for the file, the percentage of background bandwidth used for uploading, contribution percentage, progress toward expiration, etc.

In addition to information and cancel controls, background portion 620 may also present a foreground control 626. The user of the P2P file sharing client may view the file information and may wish to possess the entire file. The user may then select foreground control 626, responsive to which the P2P client may move the file from background portion 620 to foreground download portion 610. The P2P client may then move the file fragments it possesses to foreground storage and begin requesting file fragments until the client possesses the entire file.

FIG. 7 depicts an example screen of display for a preferences user interface in accordance with an illustrative embodiment. Preferences user interface dialog 700 presents controls that allow a user to enter policy and preferences information to control the behavior of a peer-to-peer (P2P) file sharing client.

In the depicted example, control portion 710 presents a radio button control with which the user may opt-in or opt-out of background file sharing. If the user selects the "No" radio button in control portion 710, then the P2P file sharing client will not participate in background file sharing. In this instance, the "Yes" radio button is selected.

Control portion 720 presents a slider control with which the user may specify an amount of bandwidth to be used for background file sharing. Although a slider control is shown, other user interface controls may be used, such as text fields, dial controls, and the like. Alternatively, the amount of bandwidth to be used for background file sharing may be determined dynamically, based on an amount of bandwidth used for foreground file sharing, bandwidth used for other applications, time of day, whether the client device is idle, and so forth.

Control portion 730 presents a slider control with which the user may specify an amount of disk space to be used for background file sharing. Although a slider control is shown, other user interface controls may be used, such as text fields and the like. Alternatively, the amount of disk space to be used for background file sharing may be determined dynamically, perhaps in conjunction with the specified amount, based on the amount of available disk space, the amount of disk space used for foreground file sharing, etc.

Control portion 740 presents an input control with which the user may specify a number of background swarms allowed. Alternatively, the number of background swarms may be determined dynamically, perhaps in conjunction with the specified number, based on the number of foreground swarms, the amount of processing resources being used for other applications, and the like.

Control portion 750 presents controls with which the user may specify expiration parameters for background file fragments. The user may specify expiration parameters in units of time or according to percentage of contribution. Alternatively, the P2P client may expire background file fragments using other parameters, such as most commonly available in the swarm, least recently requested, least frequently requested, and so forth.

Control portion 760 presents an input control with which the user may specify communities to which the user subscribes. Thus, the user may subscribe to a community of musicians or amateur film makers, and whenever a file is being distributed in a specified community, the P2P client may participate in background file sharing to help grow the swarms for those communities. The user may enter the names of the communities directly using text, or may use other selection controls that are generally known in the art.

Control portion 770 presents an input control with which the user may specify a list of trusted peers. The user may enter the names, usernames, addresses, or the like of trusted users, such as friends or co-workers, for example. Thus, when one of the trusted peers begins sharing files in a swarm, the P2P client may participate in background file sharing to help grow the swarms for the trusted peers. The user may enter the names, usernames, addresses, etc. of trusted peers directly using text, or may use other generally known selection controls.

Control portion 780 presents an input control with which the user may specify a list of blocked peers. The user may enter the names, usernames, addresses, or the like of users that are known to provide malicious or illegal content, for example. Thus, when the P2P client participates in background, or foreground, file sharing to grow a swarm, the client may refuse to receive file fragments from or provide file fragments to peers in the blocked peers list. The user may enter the names, usernames, addresses, etc. of blocked peers directly using text, or may use other generally known selection controls.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 8:
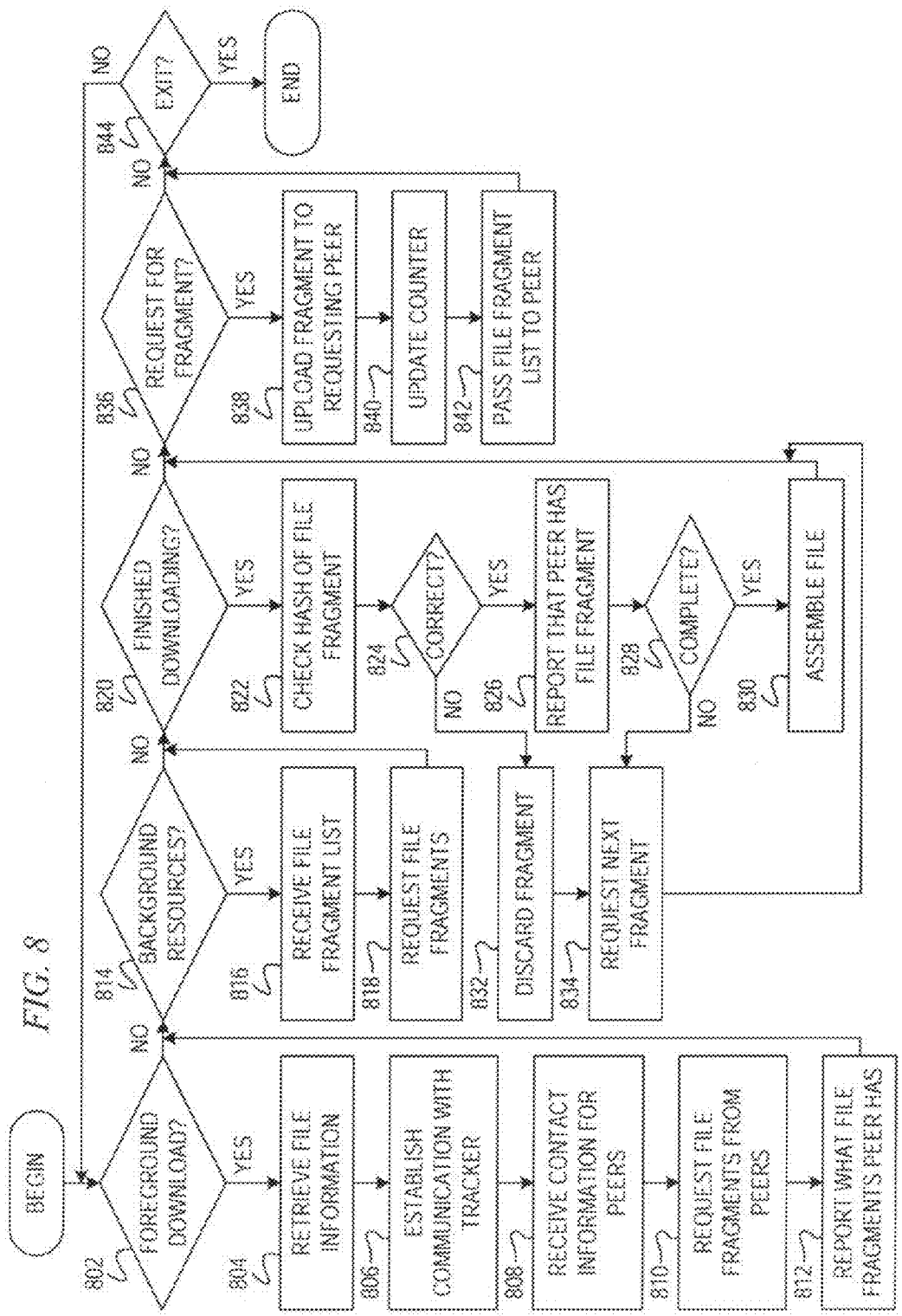
FIG. 8 presents a flowchart illustrating operation of a peer-to-peer file sharing client with background file sharing in accordance with an illustrative embodiment.

Referring now to FIG. 8, this figure provides a flowchart outlining example operations of a peer-to-peer file sharing client with background file sharing in accordance with an illustrative embodiment. Operation begins, and the peer-to-peer (P2P) client determines whether a foreground download is initiated by the user (block 802). The user may initiate a foreground download, for example, by selecting a link to file information, such as a torrent. If the P2P client determines that a foreground download is initiated, the client retrieves the file information (block 804), establishes communication with the tracker (block 806), and receives a list of contact information for peers (block 808). Then, the P2P client requests file fragments from one or more of the peers (block 810). The P2P client reports to the peers in the swarm what file fragments it possesses (block 812).

Thereafter, or if the P2P client determines that a foreground download is not initiated in block 802, the P2P client determines whether storage space and bandwidth are available for background file sharing (block 814). If background storage and bandwidth resources are available, the P2P client receives file fragment list from peers (block 816). The P2P client may request a file fragment list from peers; however, the file fragment list may be piggybacked on file fragments in a foreground download. The file fragment list may be based on file name trading, files that each peer possesses, known rare file fragments or popular files, similar files within a swarm, or pattern matching, as described above. Alternatively, as described in further detail above, the P2P client may receive a list of file fragments based on rarity of file fragments, randomly selected file fragments, or file fragments with relative or comparable size to those being shared by the P2P client. In another alternative embodiment, the P2P client may receive the file fragment list from a central server or provider, as disclosed above. Given a list of file fragments that may be shared in the background, the P2P client requests file fragments from peers (block 818). The number of file fragments the P2P client may request to share in the background may be based on an amount of background storage space or bandwidth available, rarity of the file fragments, and so forth.

Thereafter, or if the P2P client determines that background storage or bandwidth resources are not available in block 814, the P2P client determines whether a file fragment is finished downloading (block 820). This may be a foreground file fragment or a background file fragment, because the P2P client will treat the downloading of individual file fragments the same. If a file fragment is finished downloading, the P2P client performs a hash on the file fragment (block 822) and determines whether the resulting hash value is correct (block 824). The P2P client determines whether the hash value is correct based on hash information received in block 804 or in the file fragment list received in block 816. If the hash value is correct, the P2P client reports to the peers in the swarm that it has the file fragment (block 826).

Thereafter, the P2P client determines whether download of the entire file is complete (block 828). It is likely that the P2P client will completely download a file if the file is part of foreground file sharing; however, it may be possible to download an entire file in background file sharing, especially if the P2P client is not currently participating in any foreground file sharing, for instance. If the file download is complete, the P2P client assembles the file (block 830).

Returning to block 824, if the hash is not correct for the file fragment, the P2P client discards the file fragment (block 832) and requests a next file fragment (block 834). In addition, although not illustrated here, the P2P client may automatically add the peer from which the file fragment was received to a blocked peer list after a specified number of invalid file fragments. With reference to block 828, if the file download is not complete, the P2P client requests a next file fragment (block 834).

After assembling the file in block 830 or requesting a next file fragment in block 834, or if the client determines that a file fragment is not finished downloading in block 820, the P2P client determines whether a request for a file fragment is received (block 836). This request may be for a file fragment being shared in the foreground or the background, because the P2P client may treat the uploading of file fragments the same regardless of whether the file fragment is being shared in the foreground or background. Alternatively, the P2P client may give precedence to requests for file fragments being shared in the foreground or may apply other techniques, such as satisfying requests in order of rarity, for example. If a request is received for a file fragment, the P2P file sharing client uploads the requested file fragment to the requesting peer (block 838). Then, the P2P client may update a counter (block 840) to keep track of the rarity of file fragments or the popularity of files. The P2P client may also pass a file fragment list to the requesting peer (block 842). This file fragment list may include a list of the file fragments that the client possesses, a list of the rarest file fragments, a list of popular files, a correlation of files, or other file names or identifiers, as described in further detail above.

Thereafter, or if the P2P client determines that a request for a file fragment is not received in block 836, the P2P client determines whether an exit condition exists (block 844). An exit condition may exist, for example, if the user closes the P2P file sharing client, if the client device shuts down or loses connection to the P2P file sharing network, etc. If an exit condition exists, operation ends. Otherwise, if an exit condition does not exist in block 844, operation returns to block 802 to determine whether a foreground download is initiated.

Figure 9:
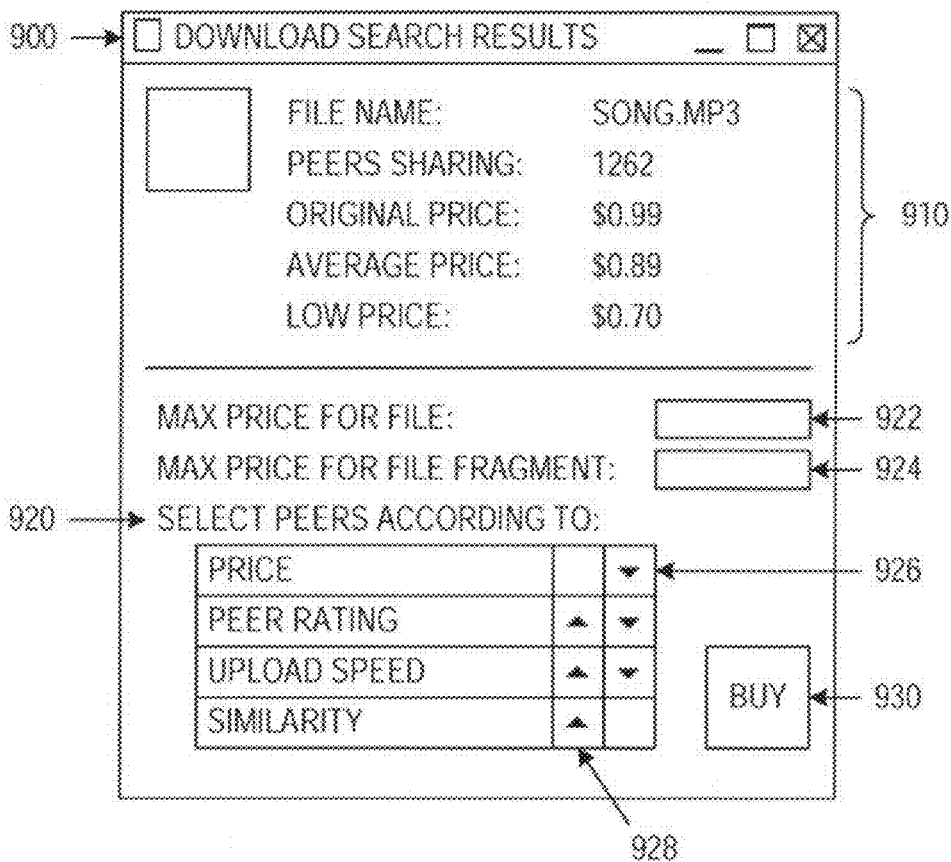
FIG. 9 depicts an example screen of display for a download user interface in accordance with an illustrative embodiment.

FIG. 9 depicts an example screen of display for a download user interface in accordance with an illustrative embodiment. Download user interface dialog 900 presents search results 910 for a given file, in this example song.mp3. Search results include an optional image associated with the file, file name, number of peer sharing, original price, average price, and low price.

Download user interface dialog 900 also includes fields for setting a price for buying a file to download via the peer-to-peer file sharing system. These fields include a maximum file price field 922, maximum file fragment price field 924, and a parameter ranking input portion 920 for ranking parameters with which the peer-to-peer file sharing client will select peers for downloading. Each parameter in input portion 920 may include a down control 926 and/or an up control 928. The user may move parameters up and down in the ranking using down controls 926 and up controls 928. Parameters in parameter ranking input portion 920 may be initialized based on stored user preferences.

In one example embodiment, maximum fragment price field 924 may be an optional field. Download user interface dialog 900 also includes a buy control 930 for initiating purchase and download of a file. Thus, when a user enters a maximum file price in field 922, sets the parameters in parameter ranking input portion 920, and selects the buy control 930, the peer-to-peer file sharing client begins to select peers for downloading the file such that downloading file fragments from those peers satisfies the information entered into download user interface dialog 900.

Figure 10:
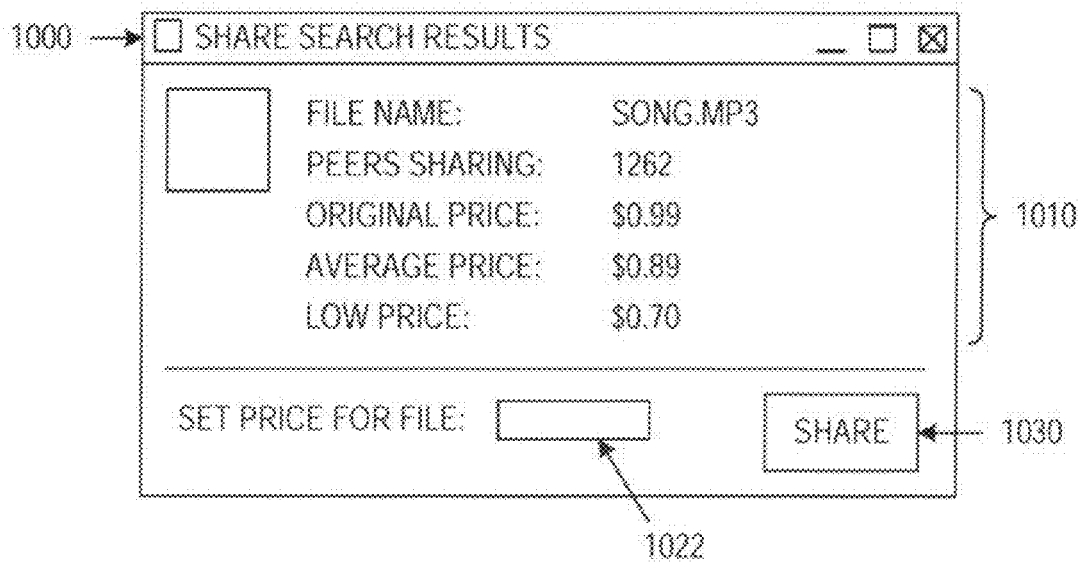
FIG. 10 depicts an example screen of display for a share user interface in accordance with an illustrative embodiment.

FIG. 10 depicts an example screen of display for a share user interface in accordance with an illustrative embodiment. Share user interface dialog 1000 presents search results 1010 for a given file, in this example song.mp3. Search results include an optional image associated with the file, file name, number of peer sharing, original price, average price, and low price.

Share user interface dialog 1000 also includes a set price for file field 1022 to allow the user to set a price for distributing the file. The price set in field 1022 indicates the price a peer would pay if that peer downloaded the entire file from the instant distributor peer. In actuality, the peer-to-peer file sharing client may determine a per-fragment price based on an even flat fee, based or rarity, or using another pricing convention. In one example embodiment, set price for file field 1022 may be optional. If the user does not enter a price into field 1022, the peer-to-peer file sharing client may simply offer the file for the original price. Share user interface dialog 1000 also includes share control 1030, which allows the user to offer the file to be shared in the peer-to-peer file sharing network. Thus, when the user enters a price into field 1022, or leaves it blank, and then selects share control 1030, the peer-to-peer file sharing client begins to offer fragments for upload to other participant peers.

Figure 11:
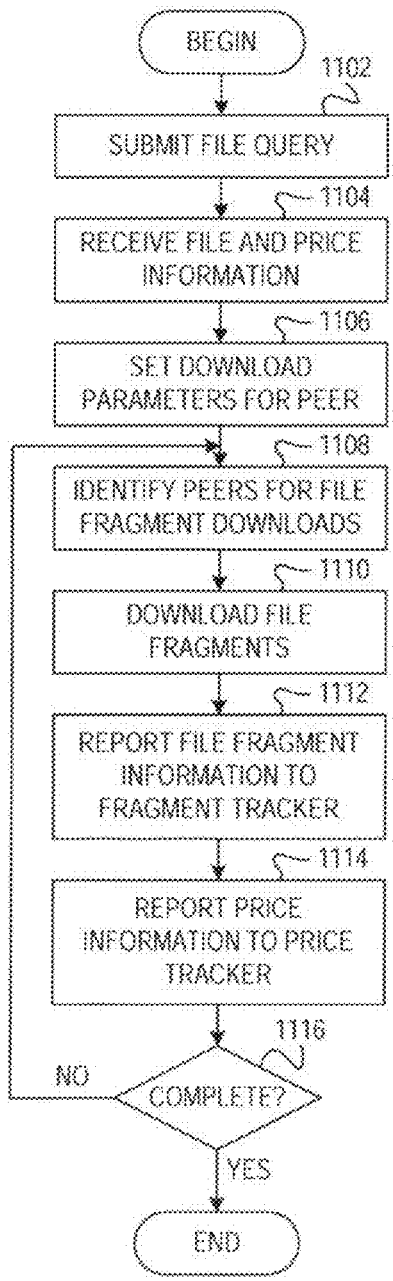
FIG. 11 provides a flowchart outlining example operations of a peer-to-peer file sharing client for downloading a file with file fragment pricing in accordance with an illustrative embodiment.

FIG. 11 provides a flowchart outlining example operations of a peer-to-peer file sharing client for downloading a file with file fragment pricing in accordance with an illustrative embodiment. Operation begins, and the peer-to-peer (P2P) client submits a file query for a file that the user wishes to download (block 1102). The P2P client then receives the file and price information (block 1104) from a content provider and/or price tracker.

The P2P client then sets download parameters for the peer (block 1106). the download parameters may include a maximum file price, a maximum file fragment price, and other parameters for ranking peers, such as price, peer rating, upload speed, similarity, etc. Given the download parameters, the P2P client identifies peers for file fragment downloads (block 1108) and begins to download file fragments from those peers (block 1110). The P2P client reports file fragment information to the fragment tracker (block 1112) and reports price information to the price tracker (block 1114).

The P2P client determines whether the file download is complete (block 1116). If the file download is not complete, operation returns to block 1108 to identify peers for file fragment downloads. If the file download is complete in block 1116, operation ends.

Figure 12:
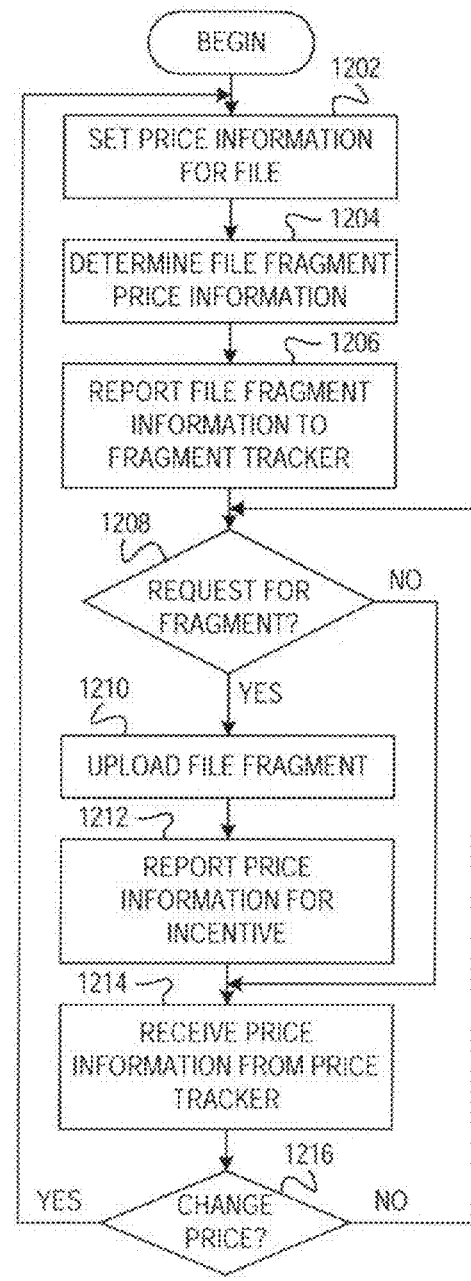
FIG. 12 provides a flowchart outlining example operations of a peer-to-peer file sharing client for sharing a file with file fragment pricing in accordance with an illustrative embodiment.

FIG. 12 provides a flowchart outlining example operations of a peer-to-peer file sharing client for sharing a file with file fragment pricing in accordance with an illustrative embodiment. Operation begins, and the peer-to-peer (P2P) client sets price information for a file (block 1202). The P2P client determines file fragment price information based on the file price information (block 1204). The P2P client may determine a per-fragment price based on an even flat fee, based or rarity, or using another pricing convention. Then, the P2P client reports the file fragment information to the fragment tracker (block 1206).

The P2P client determines whether it receives a request for a file fragment (block 1208). If the P2P client receives a request for a fragment, the P2P client uploads the file fragment (block 1210) and reports the price information for an incentive or compensation (block 1212). The downloading client may also, or alternatively, report the price information.

Then, the P2P client monitors price information by receiving price information from the price tracker (block 1214). If the P2P client does not receive a request for a file fragment in block 1208, operation returns to block 1214 to receive price information from the price tracker. The P2P client then determines whether to change the price for the file or file fragments (block 1216). The P2P client may make this determination by prompting the user for a new price. If the P2P client determines that the price is to be changed, then operation returns to block 1202 to set the price information for the file. If the P2P client determines that the price is not to be changed, then operation returns to block 1208 to determine whether a request for a file fragment is received.

Figure 13:
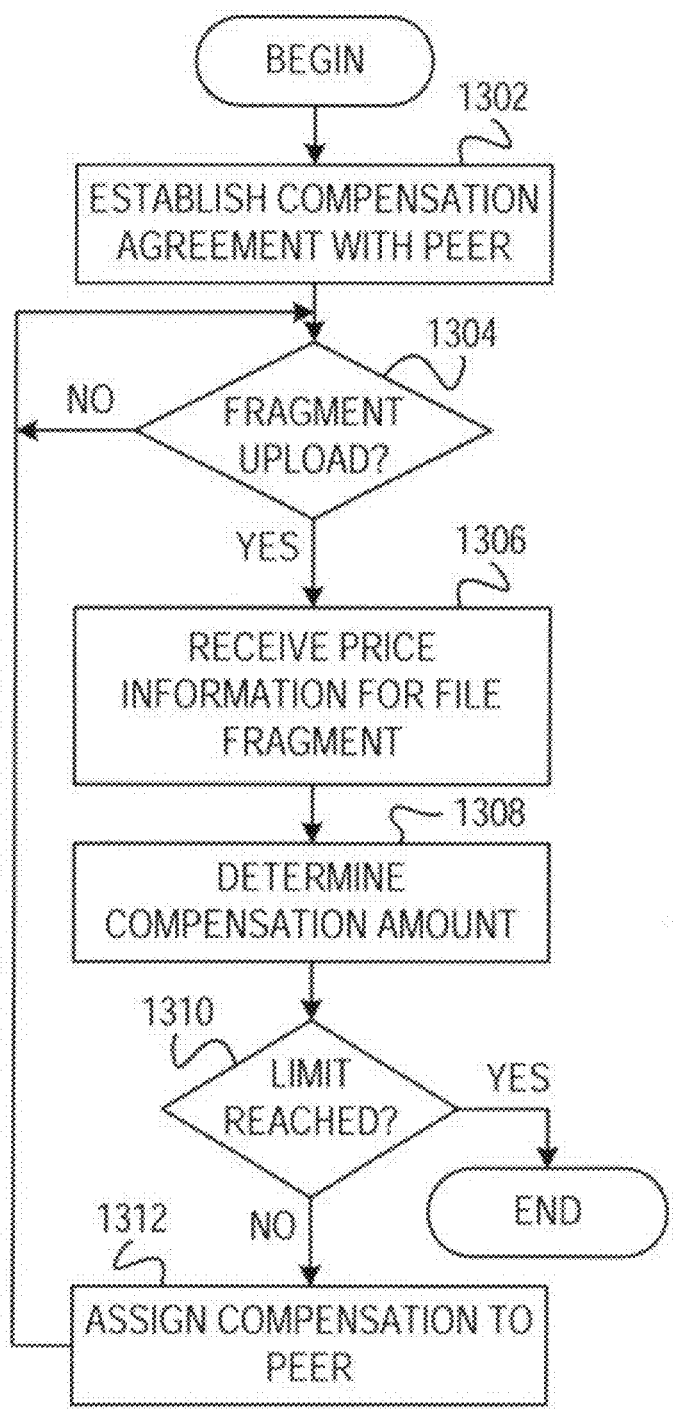
FIG. 13 provides a flowchart outlining example operations of an account management server for file fragment pricing in accordance with an illustrative embodiment.

FIG. 13 provides a flowchart outlining example operations of an account management server for file fragment pricing in accordance with an illustrative embodiment. Operation begins, and the account management server establishes a compensation agreement with a distributor peer (block 1302). The account management server determines whether the distributor peer has uploaded a file fragment to another participant peer (block 1304). The distributor peer may upload a file fragment in a foreground swarm or a background swarm. If the distributor peer does not upload a file fragment, operation returns to block 1304 to determine whether the distributor peer has uploaded a file fragment.

If the distributor peer has uploaded a file fragment in block 1304, then the account management server receives price information for the file fragment (block 1306). The account management server may receive this price information from a price tracker or from the distributor peer. Then, the account management server determines a compensation amount for the file fragment (block 1308). The account management server may determine the compensation amount based on the file fragment price, the compensation agreement, and whether the file fragment upload was part of foreground file sharing or background file sharing. For example, the compensation amount may be a predetermined percentage of the file fragment price, a predetermined percentage of the file fragment price not to exceed a predetermined percentage of the original file fragment price, the full file fragment price until a discount price is reached, or a number of reward points.

The account management server determines whether a compensation limit is reached (block 1310). The compensation limit may be a discount amount or a rewards points cap, for example. If the account management server determines that the distributor peer has not reached a compensation limit, then the account management server assigns compensation to the user (block 1312), and operation returns to block 1304 to determine whether the distributor peer has uploaded a file fragment to a another peer. If the account management server determines that the distributor peer has reached a compensation limit in block 1310, then operation ends.

Thus, the illustrative embodiments provide mechanisms for file fragment pricing in a segmented file sharing system. The mechanism allows peers to set a price for distributing a file through the file sharing system. A peer then becomes a file distributor on behalf of an original file provider. The original file provider may compensate the file distributor based on a compensation agreement. In one example embodiment, the original file provider may give the file distributor a percentage of the price set by the distributor. In another example embodiment, the original file provider may assign reward points to file distributors for each file or file fragment shared in the file sharing system. The peer's client may be configured to download file fragments from file distributors, or the original file provider, based on preferences, such as price, peer rating, upload speed, or similarity. As a result, a peer may download a file for a price that is less than the original price from the original file provider. Thus, the mechanism provides an incentive for peers to participate in file sharing, which results in larger swarms.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a peer-to-peer file sharing client for file sharing in a peer-to-peer file sharing network, the method comprising:
   presenting a download user interface for a file to be downloaded in the peer-to-peer file sharing network;
   receiving user input via the download user interface specifying maximum file price, maximum file fragment price for a plurality of file fragments that make up the file and peer selection criteria;
   identifying a plurality of peers offering the plurality of file fragments that make up the file such that downloading the plurality of file fragments from the plurality of peers satisfies the maximum file price, the maximum file fragment price and the peer selection criteria;
   presenting an upload user interface for the file to be uploaded in the peer-to-peer file sharing network;
   receiving user input via the upload user interface specifying a file price;
   responsive to receiving a request for a given file fragment within the plurality of file fragments from a requesting peer, determining a file fragment compensation price for the given file fragment and uploading the given file fragment to the requesting peer; and
   receiving compensation for uploading the given file fragment to the requesting peer according to the file fragment compensation price.

2. The method of claim 1, wherein determining the file fragment compensation price comprises setting a flat fee price for each file fragment based on the price information of the file and a number of file fragments that make up the file.

3. The method of claim 1, wherein determining the file fragment compensation price comprises setting a price for each file fragment within a number of file fragments that make up the file based on rarity.

4. The method of claim 1, wherein the compensation comprises at least one of a predetermined percentage of the file fragment compensation price or reward points.

5. The method of claim 1, wherein a tracker tracks price information in the peer-to-peer file sharing network and wherein the download user interface presents an original price, an average price, and a low price for the file being shared in the pee-to-peer file sharing network.

6. The method of claim 5, wherein the peer selection criteria comprise a ranked set of parameters including price, peer rating, upload speed, and similarity.

7. The method of claim 1, wherein a tracker tracks price information in the peer-to-peer file sharing network and wherein the upload user interface presents an original price, an average price, and a low price for the file being shared in the pee-to-peer file sharing network.

8. The method of claim 1, wherein receiving compensation for uploading the given file fragment to the requesting peer comprises determining whether the user reaches a maximum compensation limit.

9. A computer program product comprising a non-transitory computer recordable medium having a computer readable program recorded thereon, wherein the computer readable program, when executed on a computing device, causes the computing device to:
   present a download user interface for a file to be downloaded in a peer-to-peer file sharing network;
   receiving user input via the download user interface specifying maximum file price, maximum file fragment price for a plurality of file fragments that make up the file and peer selection criteria;
   identify a plurality of peers offering the plurality of file fragments that make up the file such that downloading the plurality of file fragments from the plurality of peers satisfies the maximum file price, the maximum file fragment price and the peer selection criteria;
   present an upload user interface for the file to be uploaded in the peer-to-peer file sharing network;
   receive user input via the upload user interface specifying a file price;
   responsive to receiving a request for a given file fragment within the plurality of file fragments from a requesting peer, determine a file fragment compensation price for the given file fragment and upload the given file fragment to the requesting peer; and
   receive compensation for uploading the given file fragment to the requesting peer according to the file fragment compensation price.

10. The computer program product of claim 9, wherein determining the file fragment compensation price comprises setting a price for each file fragment within the plurality of file fragments based on rarity.

11. The computer program product of claim 9, wherein the compensation comprises at least one of a predetermined percentage of the file fragment compensation price or reward points.

12. The computer program product of claim 9, wherein a tracker tracks price information in the peer-to-peer file sharing network and wherein the download user interface presents an original price, an average price, and a low price for the file beign shared in the peer-to-peer file sharing network.

13. The computer program product of claim 9, wherein the computer readable program is stored in a computer readable storage medium in a data processing system and wherein the computer readable program was downloaded over a network from a remote data processing system.

14. The computer program product of claim 9, wherein the computer readable program is stored in a computer readable storage medium in a server data processing system and wherein the computer readable program is downloaded over a network to a remote data processing system for use in a computer readable storage medium with the remote system.

15. An apparatus, comprising:
a processor; and
a memory coupled to the processor, wherein the memory comprises instructions which, when executed by the processor, cause the processor to:
present a download user interface for a file to be downloaded in a peer-to-peer file sharing network;
receive user input via the download user interface specifying maximum file price, maximum file fragment price for a plurality of file fragments that make up the file and peer selection criteria;
identify a plurality of peers offering the plurality of file fragments that make up the file such that downloading the plurality of file fragments from the plurality of peers satisfies the maximum file price the maximum file fragment price and the peer selection criteria;
present an upload user interface for The file to be uploaded in the peer-to-peer file sharing network;
receive user input via the upload user interface specifying a file price;
responsive to receiving a request for a given file fragment within the plurality of file fragments from a requesting peer, determine a file fragment compensation price for the given file fragment and upload the given file fragment to the requesting peer; and
receive compensation for uploading the given file fragment to the requesting peer according to the file fragment compensation price.

16. The apparatus of claim 15, wherein determining the file fragment compensation price comprises setting a price for each file fragment within the plurality of file fragments based on rarity.

17. The apparatus of claim 15, wherein the compensation comprises at least one of a predetermined percentage of the file fragment compensation price or reward points.

18. The apparatus of claim 15 wherein a tracker tracks price information in the peer-to-peer file sharing network and wherein the download user interface presents an original price, an average price, and a low price for the file beign shared in the peer-to-peer file sharing network.

19. The apparatus of claim 18, wherein the peer selection criteria comprise a ranked set of parameters including price, peer rating, upload speed, and similarity.

* * * * *